(12) United States Patent
Lida et al.

(10) Patent No.: US 9,521,026 B1
(45) Date of Patent: Dec. 13, 2016

(54) TOMLINSON-HARASHIMA PRECODING WITH NON-OVERLAPPING DYNAMIC MODULATION CODING SUBSETS

(71) Applicant: Valens Semiconductor Ltd., Hod Hasharon (IL)

(72) Inventors: Eyran Lida, Kfar Ha-Oranim (IL); Aviv Salamon, Raanana (IL)

(73) Assignee: Valens Semiconductor Ltd., Hod Hasharon (IL)

( * ) Notice: Subject to any disclaimer, the term of this patent is extended or adjusted under 35 U.S.C. 154(b) by 0 days.

(21) Appl. No.: 14/732,740

(22) Filed: Jun. 7, 2015

(51) Int. Cl.
*H04L 27/36* (2006.01)
*H04L 25/03* (2006.01)
*H04L 27/34* (2006.01)

(52) U.S. Cl.
CPC ......... *H04L 27/36* (2013.01); *H04L 25/03343* (2013.01); *H04L 27/3405* (2013.01)

(58) Field of Classification Search
CPC ................................................ H04L 25/03343
USPC ........................................................ 375/298
See application file for complete search history.

(56) References Cited

U.S. PATENT DOCUMENTS

| | | | |
|---|---|---|---|
| 6,067,326 A * | 5/2000 | Jonsson | H04L 25/4917 375/286 |
| 6,101,223 A | 8/2000 | Betts | |
| 6,411,657 B1 | 6/2002 | Verbin et al. | |
| 6,532,267 B1 | 3/2003 | Heegard | |
| 6,792,049 B1 | 9/2004 | Bao et al. | |
| 7,782,852 B2 | 8/2010 | Tellado et al. | |
| 8,699,551 B2 | 4/2014 | Chen et al. | |
| 2005/0289204 A1 | 12/2005 | Tellado et al. | |
| 2007/0014380 A1 | 1/2007 | Gu et al. | |
| 2015/0030062 A1* | 1/2015 | Kossel | H04L 25/03343 375/232 |

OTHER PUBLICATIONS

Barrass, H., Bennett, M., Booth, B., DiMinico, C., Kish, P., Law, D., Zimmerman, G. (2007). 10GBASE-T: 10 Giga bit Ethernet over twisted-pair Copper. ethernet alliance, Aug.

Kumar, M. N., Mitra, A., & Ardil, C. (2005). A fast adaptive Tomlinson-Harashima precoder for indoor wireless communications. World Academy of Science, Engineering and Technology, 155-158.

Chen, Y. L., & Wu, A. Y. (2010). Generalized Pipelined Tomlinson-Harashima Precoder Design Methodology With Build-In Arbitrary Speed-Up Factors. Signal Processing, IEEE Transactions on, 58(4), 2375-2382.

Albuquerque, NM, IEEE 802 10GBASE-T Tutorial, Nov. 10, 2003.

Rath, R., Schmidt, C., & Rosenkranz, W. (May 2013). Is Tomlinson-Harashima Precoding Suitable for Fiber-Optic Communication Systems?. In Photonic Networks, 14. 2013 ITG Symposium. Proceedings (pp. 1-7). VDE.

(Continued)

*Primary Examiner* — Lihong Yu
(74) *Attorney, Agent, or Firm* — Active Knowledge Ltd.

(57) ABSTRACT

A Tomlinson-Harashima Precoding (THP) transmitter transmits data modulated by non-overlapping Dynamic Modulation Coding (DMC) to a receiver. In order to enable the receiver to differentiate between the different modulations of the DMC, a novel non-overlapping DMC is used. The constellations of the non-overlapping DMC are selected such that the result of the modulo operation of the THP maintains the signal levels, belonging to the different constellations, separated.

12 Claims, 4 Drawing Sheets

(56) References Cited

OTHER PUBLICATIONS

Fischer, R. F., Tzschoppe, R., & Huber, J. B. (2001). Signal shaping for reduction of peak-power and dynamic range in precoding schemes. In Global Telecommunications Conference, 2001. GLOBECOM'01. IEEE (vol. 1, pp. 339-343). IEEE.

Rath, R., & Rosenkranz, W. (Jan. 2013). Tomlinson-Harashima Precoding for Fiber-Optic Communication Systems. In Optical Communication (ECOC 2013), 39th European Conference and Exhibition on (pp. 1-3). IET.

Wang, Y., Muller, J., & Speidel, J. (Jan. 2013). 3Gbit/s transmission over plastic optical fiber with adaptive Tomlinson-Harashima Precoded systems. In Consumer Electronics (ICCE), 2013 IEEE International Conference on (pp. 629-632). IEEE.

Costa, M. H. (1983). Writing on dirty paper (corresp.). Information Theory, IEEE Transactions on, 29(3), 439-441.

* cited by examiner

TOMLINSON-HARASHIMA PRECODING WITH NON-OVERLAPPING DYNAMIC MODULATION CODING SUBSETS

BACKGROUND

Tomlinson-Harashima Precoding (THP) of static Pulse-Amplitude Modulation (PAM) is a known method to reduce receiver complexity, to allow spectral shaping in the transmitter to reduce alien cross-talk coupling, and to eliminate Decision Feedback Equalizer (DFE) error propagation even with large DFE coefficients. For example, 10GBASE-T, or IEEE 802.3an-2006, is a standard released in 2006 to provide 10 Gbit/s connections over unshielded or shielded twisted pair cables, over distances of up to 100 meters. The 802.3an standard specifies the wire-level modulation for 10GBASE-T to be Tomlinson-Harashima precoding (THP) pulse-amplitude modulation with 16 discrete levels (PAM-16) of {−15, −13, −11, −9, −7, −5, −3, −1, 1, 3, 5, 7, 9, 11, 13, 15}, encoded in a two-dimensional checkerboard pattern known as DSQ128 sent on the line at 400M symbols/sec.

Dynamic Modulation Coding (DMC) using overlapping subsets is a known method to achieve variable bit rates and different level of error resistance. For example, HDBaseT® Specification version 1 uses overlapping subsets of PAM-16 {−15, −13, −11, −9, −7, −5, −3, −1, 1, 3, 5, 7, 9, 11, 13, 15}, PAM-8 {−15, −11, −7, −3, 3, 7, 11, 15}, PAM-4 {−15, −7, 7, 15}, and PAM-2 {−7, 7}.

BRIEF SUMMARY

In one embodiment, a non-overlapping Dynamic Modulation Coding designed to be used with a Tomlinson-Harashima Precoding transmitter, includes: a first Pulse-Amplitude Modulation constellation of M levels (PAM-M), and a second Pulse-Amplitude Modulation constellation of N levels (PAM-N), wherein M>N; the PAM-M and PAM-N constellations have different levels without any overlap thereof; wherein the Tomlinson-Harashima Precoding transmitter uses modulo K*M, where K is an integer equal or greater than two; and wherein the PAM-M and PAM-N constellations are characterized by the fact that the result of the modulo K*M operation applied to the PAM-M and PAM-N constellations maintains the signal levels belonging to the different constellations without any overlap thereof.

In another embodiment, a Tomlinson-Harashima Precoding transmitter, includes: a signal generator configured to produce non-overlapping Dynamic Modulation Coding signals comprising: a first Pulse-Amplitude Modulation constellation of M levels (PAM-M), and a second Pulse-Amplitude Modulation constellation of N levels (PAM-N); wherein M>N, and the PAM-M and PAM-N constellations have different levels without any overlap thereof; a Tomlinson-Harashima Precoder configured to receive the non-overlapping Dynamic Modulation Coding signals and a compensation signal, and output a modulo K*M result, where K is an integer equal or greater than two; wherein the PAM-M and PAM-N constellations are characterized by the fact that the result of the modulo K*M operation applied to the PAM-M and PAM-N constellations maintains the signal levels belonging to the different constellations separated.

BRIEF DESCRIPTION OF THE DRAWINGS

The embodiments are herein described, by way of example only, with reference to the accompanying drawings. In the drawings.

DETAILED DESCRIPTION

Figure 1:
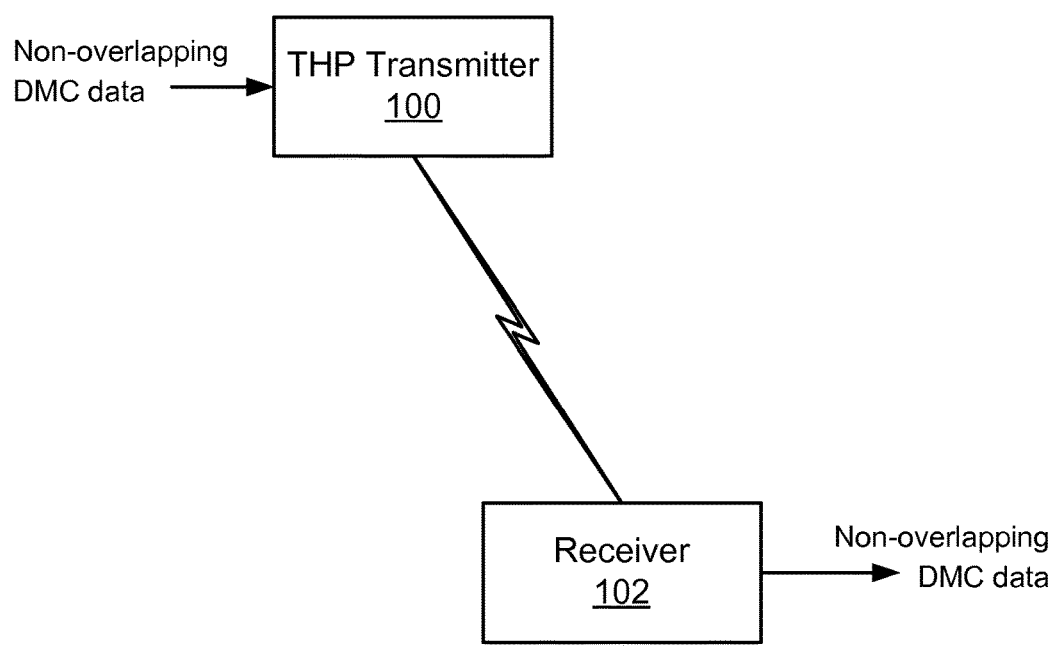
FIG. 1 illustrates Tomlinson-Harashima Precoding (THP) transmitter.

FIG. 1 illustrates Tomlinson-Harashima Precoding (THP) transmitter 100 that transmits data modulated by non-overlapping Dynamic Modulation Coding (DMC) to a receiver 102. In order to enable the receiver 102 to differentiate between the different modulations of the Dynamic Modulation Coding, a novel non-overlapping Dynamic Modulation Coding is used. The constellations of the non-overlapping DMC are selected such that the result of the modulo operation of the Tomlinson-Harashima Precoding maintains the signal levels, belonging to the different constellations, separated.

Figure 2A:
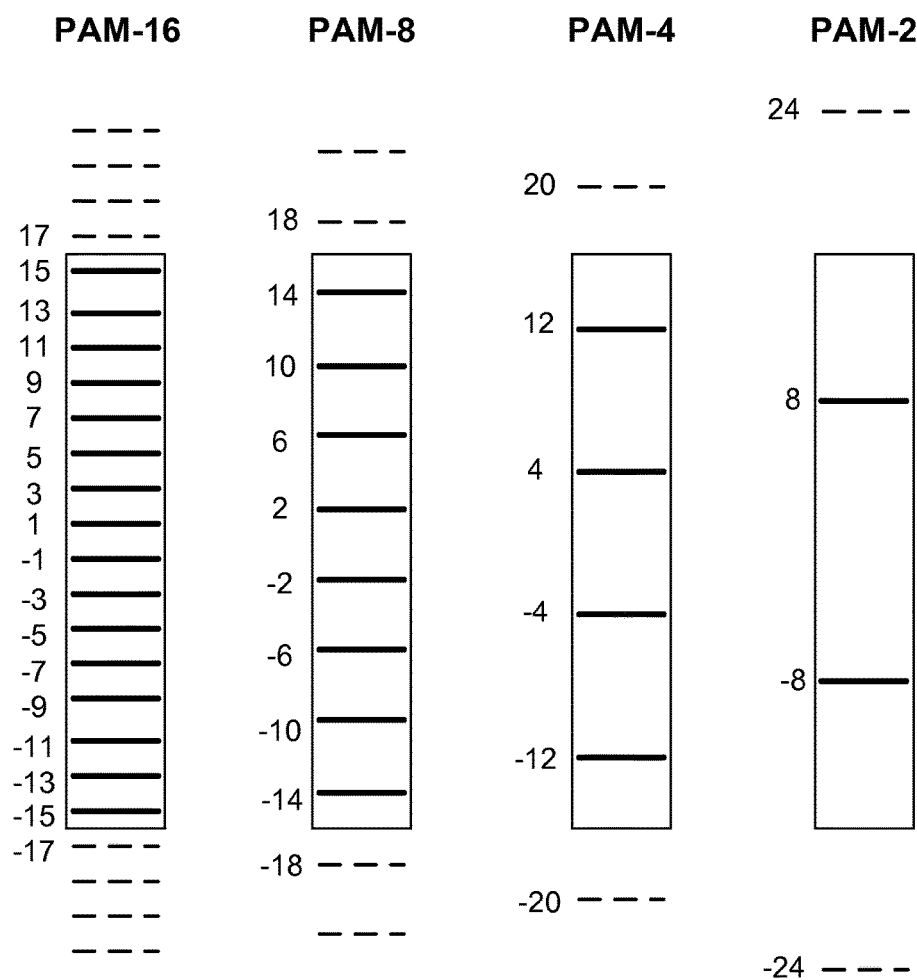
FIG. 2A illustrates one example of non-overlapping Dynamic Modulation Coding.

FIG. 2A illustrates one example of non-overlapping Dynamic Modulation Coding for the case of PAM-16, PAM-8, PAM-4, and PAM-2 with modulo 32 Tomlinson-Harashima Precoding. In the example, the non-overlapping subsets are PAM-16 {−15, −13, −11, −9, −7, −5, −3, −1, 1, 3, 5, 7, 9, 11, 13, 15}, PAM-8 {−14, −10, −6, −2, 2, 6, 10, 14}, PAM-4 {−12, −4, 4, 12}, and PAM-2 {−8, 8}. The non-overlapping Dynamic Modulation Coding constellations illustrated in FIG. 2A maintain the signal levels separated after the modulo 32 operation. Moreover, the non-overlapping Dynamic Modulation Coding uses even levels that were not used previously by the prior art.

Figure 2B:
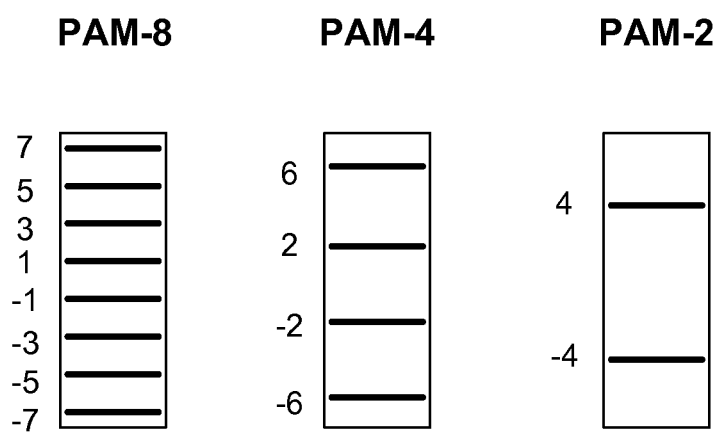
FIG. 2B illustrates another example of non-overlapping Dynamic Modulation Coding.

FIG. 2B illustrates another example of non-overlapping Dynamic Modulation Coding for the case of PAM-8, PAM-4, and PAM-2 with modulo 16 Tomlinson-Harashima Precoding. In the example, the non-overlapping subsets are PAM-8 {−7, −5, −3, −1, 1, 3, 5, 7,}, PAM-4 {−6, −2, 2, 6}, and PAM-2 {−4, 4}. This example also demonstrates non-overlapping Dynamic Modulation Coding that maintains the signal levels separated after the modulo 16 operation.

Figure 3A:
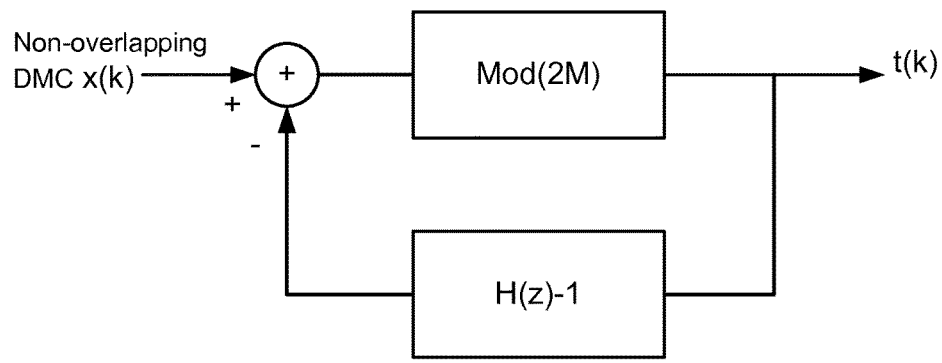
FIG. 3A illustrates one embodiment of a Tomlinson-Harashima Precoding transmitter.

FIG. 3A illustrates one embodiment of a Tomlinson-Harashima Precoding transmitter that receives non-overlapping Dynamic Modulation Coding designed with separation not to be affected by the modulo 2M operation.

Figure 3B:
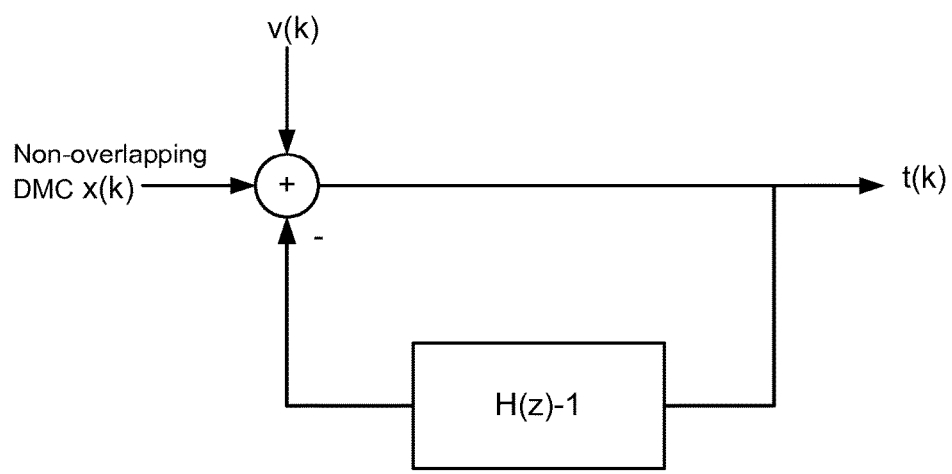
FIG. 3B illustrates one embodiment of an equivalent form of the Tomlinson-Harashima Precoding.

FIG. 3B illustrates one embodiment of an equivalent form of the Tomlinson-Harashima Precoding where a compensation signal v(k), which is a multiple of 2M, is added to the transmitted non-overlapping Dynamic Modulation Coding x(k), such that the output of the precoder t(k) lies within the interval [−M, M).

In one embodiment, a non-overlapping Dynamic Modulation Coding designed to be used with a Tomlinson-Harashima Precoding transmitter, includes a first Pulse-Amplitude Modulation constellation of M levels (PAM-M), and a second Pulse-Amplitude Modulation constellation of N levels (PAM-N). For the purpose of the discussion, M is assumed to be greater than N. The PAM-M and PAM-N constellations have different levels without any overlap thereof. The Tomlinson-Harashima Precoding transmitter uses modulo K*M, where K is an integer equal or greater than two, such as modulo 2M. Due to the fact that the PAM-M and PAM-N constellations have different levels without any overlap thereof, the result of the modulo K*M operation applied to the PAM-M and PAM-N constellations still maintains the signal levels belonging to the different constellations without any overlap thereof.

In one example, the non-overlapping Dynamic Modulation Coding utilizes odd levels for the highest constellation, and non-overlapping even levels for the other constellations. In another example, the non-overlapping Dynamic Modulation Coding includes the following constellations: PAM-16 {−15, −13, −11, −9, −7, −5, −3, −1, 1, 3, 5, 7, 9, 11, 13, 15}, and PAM-8 {−14, −10, −6, −2, 2, 6, 10, 14}. Optionally, the non-overlapping Dynamic Modulation Coding further includes the following constellations: PAM-4 {−12, −4, 4, 12}, and PAM-2 {−8, 8}.

In another example, the non-overlapping Dynamic Modulation Coding includes the following constellations: PAM-8 {−7, −5, −3, −1, 1, 3, 5, 7,}, PAM-4 {−6, −2, 2, 6}. Optionally, the non-overlapping Dynamic Modulation Coding further includes the constellation PAM-2 {−4, 4}.

In one embodiment, a Tomlinson-Harashima Precoding transmitter includes a signal generator and a Tomlinson-Harashima Precoder. The signal generator produces non-overlapping Dynamic Modulation Coding signals including: a first Pulse-Amplitude Modulation constellation of M levels (PAM-M), and a second Pulse-Amplitude Modulation constellation of N levels (PAM-N). Again, for the purpose of the discussion, M is assumed to be greater than N. The PAM-M and PAM-N constellations have different levels without any overlap thereof. The Tomlinson-Harashima Precoder receives the non-overlapping Dynamic Modulation Coding signals and a compensation signal. The Tomlinson-Harashima Precoder outputs a modulo K*M result, where K is an integer equal or greater than two, such as modulo 2M. Due to the fact that the PAM-M and PAM-N constellations have different levels without any overlap thereof, the result of the modulo K*M operation applied to the PAM-M and PAM-N constellations still maintains the signal levels belonging to the different constellations without any overlap thereof.

In one example, the non-overlapping Dynamic Modulation Coding utilizes odd levels for the highest constellation, and non-overlapping even levels for the other constellations. In another example, the non-overlapping Dynamic Modulation Coding includes the following constellations: PAM-16 {−15, −13, −11, −9, −7, −5, −3, −1, 1, 3, 5, 7, 9, 11, 13, 15}, and PAM-8 {−14, −10, −6, −2, 2, 6, 10, 14}. Optionally, the non-overlapping Dynamic Modulation Coding further includes the following constellations: PAM-4 {−12, −4, 4, 12}, and PAM-2 {−8, 8}. In another example, the non-overlapping Dynamic Modulation Coding includes the following constellations: PAM-8 {−7, −5, −3, −1, 1, 3, 5, 7,}, PAM-4 {−6, −2, 2, 6}. Optionally, the non-overlapping Dynamic Modulation Coding further includes the constellation PAM-2 {−4, 4}.

In this description, references to "one embodiment" mean that the feature being referred to may be included in at least one embodiment of the invention. Moreover, separate references to "one embodiment" or "some embodiments" in this description do not necessarily refer to the same embodiment. Additionally, references to "one embodiment" and "another embodiment" may not necessarily refer to different embodiments, but may be terms used, at times, to illustrate different aspects of an embodiment.

The embodiments of the invention may include any variety of combinations and/or integrations of the features of the embodiments described herein. Although some embodiments may depict serial operations, the embodiments may perform certain operations in parallel and/or in different orders from those depicted. Moreover, the use of repeated reference numerals and/or letters in the text and/or drawings is for the purpose of simplicity and clarity and does not in itself dictate a relationship between the various embodiments and/or configurations discussed. The embodiments are not limited in their applications to the details of the order or sequence of steps of operation of methods, or to details of implementation of devices, set in the description, drawings, or examples. Moreover, individual blocks illustrated in the figures may be functional in nature and therefore may not necessarily correspond to discrete hardware elements.

Certain features of the embodiments, which may have been, for clarity, described in the context of separate embodiments, may also be provided in various combinations in a single embodiment. Conversely, various features of the embodiments, which may have been, for brevity, described in the context of a single embodiment, may also be provided separately or in any suitable sub-combination. Embodiments described in conjunction with specific examples are presented by way of example, and not limitation. Moreover, it is evident that many alternatives, modifications, and variations will be apparent to those skilled in the art. It is to be understood that other embodiments may be utilized and structural changes may be made without departing from the scope of the embodiments. Accordingly, this disclosure is intended to embrace all such alternatives, modifications, and variations that fall within the spirit and scope of the appended claims and their equivalents.

What is claimed is:

1. A Tomlinson-Harashima Precoding transmitter, comprising:
    a signal generator configured to produce non-overlapping Dynamic Modulation Coding signals comprising: a first Pulse-Amplitude Modulation constellation of M levels (PAM-M), and a second Pulse-Amplitude Modulation constellation of N levels (PAM-N), wherein M>N; wherein the meaning of producing Dynamic Modulation Coding is that a receiver expects to receive either PAM-M or PAM-N signals, and not just PAM-M signals or just PAM-N signals;
    wherein the PAM-M and PAM-N constellations have different levels without any overlap thereof; and
    wherein the Tomlinson-Harashima Precoding transmitter uses modulo K*M, where K is an integer equal to or greater than two; and wherein the result of the modulo K*M operation applied to the PAM-M and PAM-N constellations maintains the signal levels belonging to the different constellations without any overlap thereof.

2. The Tomlinson-Harashima Precoding transmitter of claim 1, wherein the non-overlapping Dynamic Modulation Coding utilizes odd levels for highest constellation, and non-overlapping even levels for other constellations.

3. The Tomlinson-Harashima Precoding transmitter of claim 1, wherein the non-overlapping Dynamic Modulation Coding comprises the following constellations: PAM-16 {−15, −13, −11, −9, −7, −5, −3, −1, 1, 3, 5, 7, 9, 11, 13, 15}, and PAM-8 {−14, −10, −6, −2, 2, 6, 10, 14}.

4. The Tomlinson-Harashima Precoding transmitter of claim 3, wherein the non-overlapping Dynamic Modulation Coding further comprises the following constellations: PAM-4 {−12, −4, 4, 12}, and PAM-2 {−8, 8}.

5. The Tomlinson-Harashima Precoding transmitter of claim 1, wherein the non-overlapping Dynamic Modulation Coding comprises the following constellations: PAM-8 {−7, −5, −3, −1, 1, 3, 5, 7,}, and PAM-4 {−6, −2, 2, 6}.

6. The Tomlinson-Harashima Precoding transmitter of claim 5, wherein the non-overlapping Dynamic Modulation Coding further comprises the constellation: PAM-2 {−4, 4}.

7. A Tomlinson-Harashima Precoding transmitter, comprising:
- a signal generator configured to produce non-overlapping Dynamic Modulation Coding signals comprising: a first Pulse-Amplitude Modulation constellation of M levels (PAM-M), and a second Pulse-Amplitude Modulation constellation of N levels (PAM-N); wherein M>N, and the PAM-M and PAM-N constellations have different levels without any overlap thereof; and wherein the meaning of producing Dynamic Modulation Coding is that a receiver expects to receive either PAM-M or PAM-N signals, and not just PAM-M signals or just PAM-N signals; and
- a Tomlinson-Harashima Precoder configured to receive the non-overlapping Dynamic Modulation Coding signals and a compensation signal, and to output a modulo K*M result, where K is an integer equal to or greater than two; wherein the result of the modulo K*M operation applied to the PAM-M and PAM-N constellations maintains the signal levels belonging to the different constellations separated.

8. The Tomlinson-Harashima Precoding transmitter of claim 7, wherein the non-overlapping Dynamic Modulation Coding utilizes odd levels for highest constellation, and non-overlapping even levels for other constellations.

9. The Tomlinson-Harashima Precoding transmitter of claim 7, wherein the non-overlapping Dynamic Modulation Coding comprises the following constellations: PAM-16 {−15, −13, −11, −9, −7, −5, −3, −1, 1, 3, 5, 7, 9, 11, 13, 15}, and PAM-8 {−14, −10, −6, −2, 2, 6, 10, 14}.

10. The Tomlinson-Harashima Precoding transmitter of claim 9, wherein the non-overlapping Dynamic Modulation Coding further comprises the following constellations: PAM-4 {−12, −4, 4, 12}, and PAM-2 {−8, 8}.

11. The Tomlinson-Harashima Precoding transmitter of claim 7, wherein the non-overlapping Dynamic Modulation Coding comprises the following constellations: PAM-8 {−7, −5, −3, −1, 1, 3, 5, 7,}, and PAM-4 {−6, −2, 2, 6}.

12. The Tomlinson-Harashima Precoding transmitter of claim 11, wherein the non-overlapping Dynamic Modulation Coding further comprises the constellation: PAM-2 {−4, 4}.

* * * * *